United States Patent [19]

Meyer-Kahrweg

[11] 4,323,037
[45] Apr. 6, 1982

[54] FLUIDIZED BED FIRING UNIT

[75] Inventor: Helmut Meyer-Kahrweg, Wuppertal, Fed. Rep. of Germany

[73] Assignee: Steag Aktiengesellschaft, Essen, Fed. Rep. of Germany

[21] Appl. No.: 175,207

[22] PCT Filed: Mar. 19, 1979

[86] PCT No.: PCT/DE79/00030
§ 371 Date: Nov. 18, 1979
§ 102(e) Date: Nov. 8, 1979

[87] PCT Pub. No.: WO79/00794
PCT Pub. Date: Oct. 18, 1979

[51] Int. Cl.³ .............................................. F23D 19/02
[52] U.S. Cl. .................................. 122/4 D; 110/245; 34/57 A
[58] Field of Search ............ 122/4 D; 34/57 A, 57 B; 110/245; 432/15, 58

[56] References Cited

U.S. PATENT DOCUMENTS

| | | | |
|---|---|---|---|
| 2,848,820 | 8/1958 | Wallin et al. | 34/23 |
| 2,976,853 | 3/1961 | Hunter et al. | 122/4 D |
| 3,048,153 | 8/1962 | Abrahamsen | 122/4 D |
| 3,550,916 | 12/1970 | Hoppe | 34/57 A |
| 3,902,462 | 9/1975 | Bryers | 110/245 |
| 3,983,927 | 10/1976 | Steever et al. | 122/4 D |
| 4,021,931 | 5/1977 | Russ et al. | 34/156 |
| 4,035,152 | 7/1977 | Yang et al. | 432/15 |
| 4,096,909 | 6/1978 | Jukkola | 122/4 D |
| 4,184,438 | 1/1980 | Bryer et al. | 122/4 D |
| 4,196,676 | 4/1980 | Brown et al. | 122/4 D |

FOREIGN PATENT DOCUMENTS

| | | |
|---|---|---|
| 2106941 | 8/1972 | Fed. Rep. of Germany . |
| 2335514 | 2/1975 | Fed. Rep. of Germany . |
| 1517268 | 3/1968 | France . |
| 2262776 | 9/1975 | France . |
| 1190287 | 4/1970 | United Kingdom . |
| 1339287 | 11/1973 | United Kingdom . |

Primary Examiner—Henry C. Yuen
Attorney, Agent, or Firm—Andrus, Sceales, Starke & Sawall

[57] ABSTRACT

A fluidized bed firing unit, in which a fluidized bed of comparatively inert material is maintained in a container having cooled or insulated walls and a flow-bottom by means of air entering through flow nozzles in the bottom, the fuel being fed to the fluidized bed after the latter has been heated to the ignition temperature of the fuel. The air supplied through the air nozzles in the flow bottom for the purpose of producing the fluidized bed, is forced into at least one component of motion causing the fluidized bed to circulate in a horizontal plane while the fuel is fed in the lower part of the fluidized bed, preferably in the area of approximately 20% of the bed height. The motion component moving the fluidized bed in the circulating motion is preferably produced by off center feeding-in of additional air. It is expedient if at least the air nozzles in the area of the container walls are inclined with respect to vertical in the same direction. If desired, all air nozzles can be inclined with respect to the vertical in the same movement direction and/or the inclined nozzles be arranged in the form of a single or multiple spiral in the flow bottom.

The inclined nozzles are preferably chamfered at the output end. With a fluidized bed firing unit of this type with vertical heat exchanger coils arranged in the area of the fluidized bed, the respective regions of the fluidized bed lying between the coils are moved in a circulating motion. The inclined nozzles can also be arranged in the form of a single or multiple spiral in the flow-bottom, while the central region of the spiral can be occupied with only upwardly directed air nozzles.

2 Claims, 5 Drawing Figures

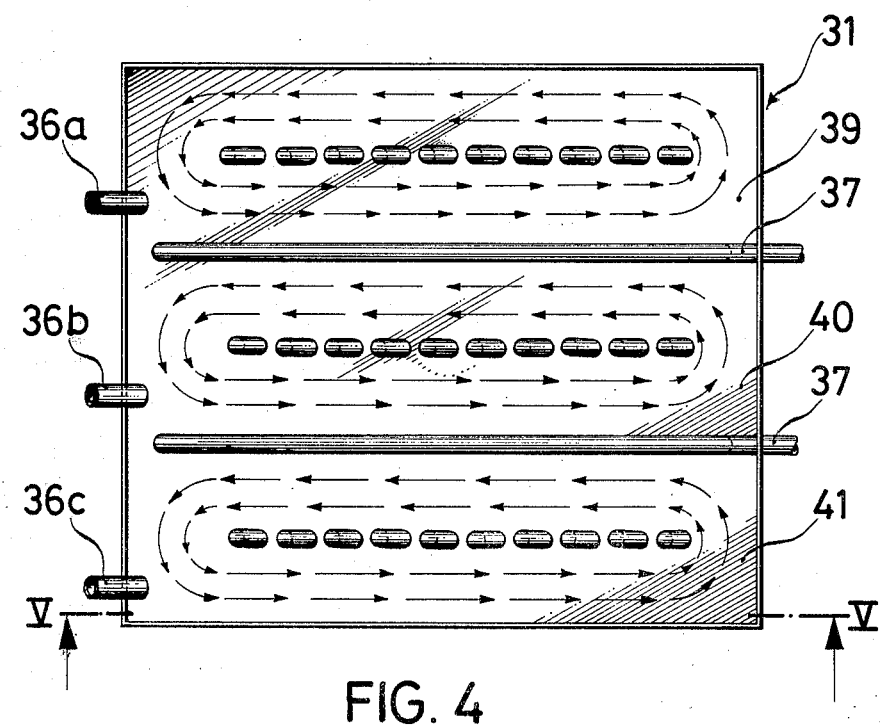
FIG. 4
FIG. 5
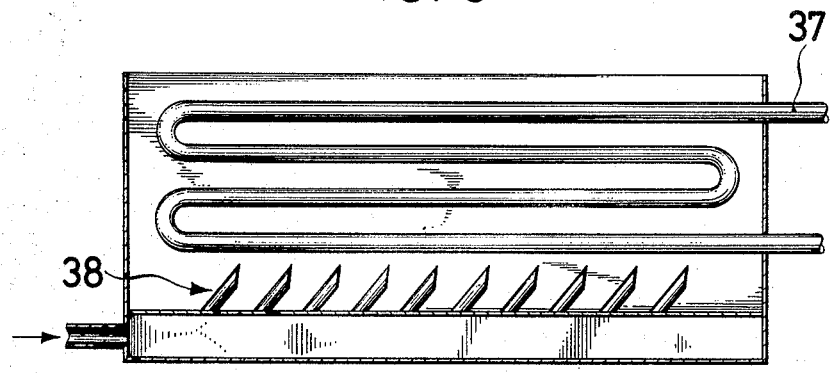

FLUIDIZED BED FIRING UNIT

The invention relates to a fluidized bed firing unit, in which a fluidized bed of comparatively inert material is maintained in a container, having cooled or insulated walls and a flow-bottom, by means of air entering through nozzles in the said bottom, the fuel being fed to the said fluidized bed after the latter has been heated to the ignition temperature of the fuel.

Fluidized-bed firing units are used more particularly for burning coal in the form of lumps, dust or sludge, and similar wastes or the like. The combustion air supplied through the nozzles in the flow-bottom is not only distributed uniformly but also produces a constant turbulence up and down vortexing in the mass of the bed, thus causing intensive mixing of the fuel, the air and the inert material serving as a heat carrier, especially in the vertical direction. In contrast to this, particles moving horizontally do so at a very low velocity, and it is therefore necessary, right from the start, to produce uniform distribution over the fluidized bed not only of combustion air but also of fuel.

The prior art discloses feeding of the fuel into the fluidized bed, from above, through one or more downshafts. This type of feed, although very rugged and simple, has the disadvantage of poor horizontal mixing, which means that the firing of the fluidized bed must be carried out with a large excess of air. Also disclosed in the prior art is the feeding of fuel, through one or more worm distributors, laterally into the fluidized bed, but in this case horizontal mixing is even more unsatisfactory. It is better if finely-granular fuel can be introduced as far as possible down into the fluidized bed, so that the fine particles are forced to pass through the entire fluidized layer and thus have sufficient time to burn out.

Also disclosed in the prior art is the practice of feeding into the fluidized bed from above through one or more projection-loaders. In this case horizontal fuel distribution is comparatively satisfactory, but fine fuel particles may be discharged with the flue gas and are therefore not burned. A feed of this kind is therefore suitable only relatively coarse fuel.

Also pertaining to the prior art is the pneumatic feeding of fuel through nozzles arranged uniformly over the flow-bottom. This allows the fuel to be distributed very uniformly in the fluidized bed, both vertically and horizontally. Fine particles of fuel must pass vertically through the fluidized layer and highly satisfactory combustion values are achieved. Only a small amount of excess air need be used. However, this type of fuel feed is technically complex. For pneumatic transportation, the fuel, for instance coal, must be ground to a relatively fine grain size -6 mm at the most, and must also be dried to a water content of less than 5%. The ground and dried fuel then has to be fed in a flow of air, through numerous pipelines, to the fuel nozzles in the flow-bottom. Moreover, in this pneumatic supply system, wear and blockages cannot be ruled out. Furthermore, additional compressors are needed to produce the carrier air.

It is the purpose of the invention to provide a simple fluidized-bed firing unit which will avoid a large excess of air, but will ensure uniform distribution of the fuel in the fluidized bed, especially in the horizontal direction, and thus uniform combustion of all particles of fuel fed to the fluidized bed.

According to the invention, this purpose is achieved in that the air supplied through the nozzles in the flow-bottom, for the purpose of producing the fluidized bed, is forced into at least one component of motion causing the said fluidized bed to circulate in a horizontal plane, while the fuel is fed to the lower part of the fluidized bed.

The fuel may also be supplied through one or more worm distributors which are laterally mounted on the outer walls of the container containing the fluidized bed firing unit and the outlet apertures of which are located sufficiently far beneath the surface of the fluidized bed.

The fuel is preferably introduced into the fluidized bed at about 20% of the total height thereof.

The circulating motion of the fluidized bed ensures that the particles of fuel, introduced at one or more locations, will be distributed as quickly as possible over the cross section of the bed.

This circulating motion of the fluidized bed may be produced in a variety of ways. For example, the air producing the fluidized bed, and entering substantially vertically, may be forced into a desired circulating motion by feeding-in additional air off-centrally. A plurality of such off-centre supplies for such additional air may be used.

It is also possible to incline at least the air nozzles in the vicinity of the wall of the container at an angle to the vertical and in the same direction. This again imparts, to the air flowing vertically upwards, a component producing a circulating fluidized bed. According to another configuration of the invention, the angle of inclination may vary from nozzle to nozzle to some extent, thus contributing further turbulence in a horizontal plane.

As soon as the fluidized-bed firing is shut down, the layer of inert material hitherto in suspension collapses onto the more or less obliquely arranged nozzles in the flow-bottom. In order to prevent the particles of inert material from entering the air nozzles and passing into the underlying air chests and contaminating them, it is proposed, according to still another configuration of the invention, to cut off obliquely the outlet ends of the said air nozzles, the cutting direction being such that the remaining part of each nozzle covers the outlet from above.

If the fluidized-bed firing unit is equipped with heat exchangers, it is desirable, according to a further embodiment of the invention, to impart a circulating motion to the areas between the coils of the pipes.

The inclined nozzles may also be arranged in one or more spirals in the flow-bottom, the central area containing nozzles directed upwardly in the normal way. This arrangement also provides the fluidized bed with an adequate circulating motion.

Examples of embodiments explaining the invention in greater detail are illustrated in the drawings attached hereto, wherein:

FIG. 4 shows a design for a fluidized bed with heat exchangers; and

FIG. 5 is a section along the line V—V in FIG. 4.

Figure 1:
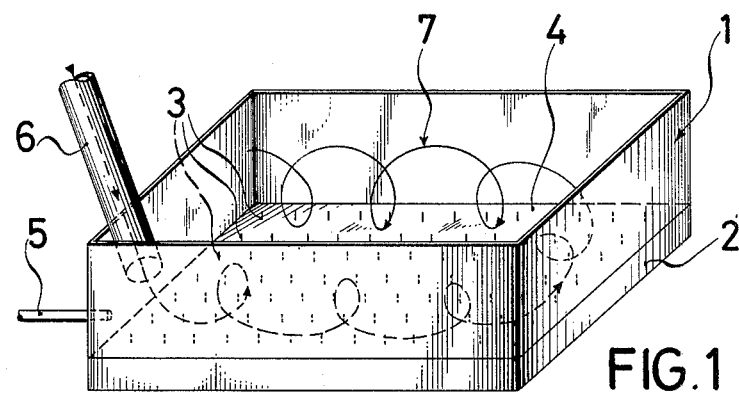
FIG. 1 is a diagrammatic representation of the container for a fluidized bed.

In FIG. 1 the numeral 1 indicates a container provided with cooled or insulated walls which, for the sake of simplicity, are not shown in detail, but appear diagrammatically and merely as defining walls.

Located under container 1 is an air chest 2 for the supply of combustion air. The nozzles are marked 3 and are distributed substantially uniformly over the entire flow-bottom 4 of container 1. In addition to nozzles 3, a pipeline 5 opens into container 1, through which additional air is introduced. Thus the fluidized bed produced in container 1 by the air emerging from nozzles 3 receives a component of motion from the additional air introduced at 5. This results in a circulating motion of this air, and thus of the fluidized bed built up in container 1.

The fuel-supply line is marked 6. Line 7 shows how the fuel is placed in suspension by the air entering through nozzles 3 and is caused to circulate in the container by the air entering through nozzle 5.

Figure 2:
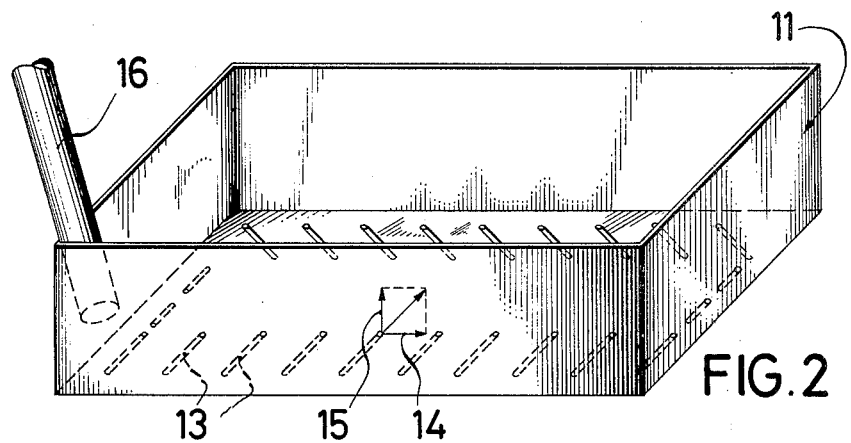
FIG. 2 illustrates a container similar to that in FIG. 1, but with the air imparting a circulating motion to the fluidized bed supplied in a different way.

The same motion is achieved, according to FIG. 2 in that nozzles 13 are directed obliquely in container 11, so that the air emerging therefrom has a component of motion in the direction of arrow 14 and arrow 15. This also produces a circulating fluidized bed, into which the fuel is introduced through pipeline 16. It should be noted that the fuel is introduced as deeply as possible into the fluidized bed, as in FIG. 1.

Figure 3:
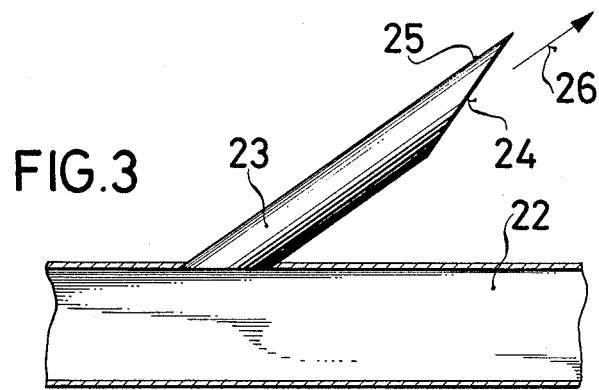
FIG. 3 is a partial view of a feed-nozzle.

FIG. 3 shows at 22 a part section through an air chest carrying a plurality of nozzles 23 set at an appropriate angle, as for example in the manner shown in FIG. 2. In order to prevent material from the bed and/or fuel from entering nozzle 23 when the firing is shut down, the said nozzle is chamfered as shown at 24 in such a manner as to leave a projection 25 above the opening which prevents material from entering nozzle 23 and thus reaching air chest 22. Arrow 26 shows the outlet direction of the air. This motion may also be divided, in a manner known per se, into two components, one at right angles to air chest 22 and one parallel therewith. This again produces a circulating motion of the air and thus of the fluidized bed in the corresponding container.

It is obviously possible to arrange several rows of nozzles 13, in FIG. 1, side by side, in which case the central area need not necessarily contain nozzles set at an angle, but may be equipped with nozzles entering vertically through the bottom in the usual way.

In the example of embodiment according to FIG. 4 which should be considered in conjunction with that in FIG. 5, pipe coils 37 are arranged in container 31 between fuel lines 36a, 36b and 36c, coil 37 being also shown in FIG. 5. These coils are parts of heat exchangers and, in the example of embodiment illustrated, they divide container 31 into three sections. In order to prevent the fluidized bed from being disturbed by pipe coils 37, it is divided here into three parts. Here again suitably inclined nozzles 38 produce a circulating motion of parts of the fluidized bed. Thus three fluidized beds are produced in this case, as shown at 39, 40, and 41. The central nozzles need not necessarily be set at an angle, but may enter the container vertically through the bottom, as in FIG. 1. Here again, as in FIG. 5, the nozzles should be camfered as in the example of embodiment according to FIG. 3.

What is claimed is:

1. A fluidized bed firing unit comprising:
   a container having walls and a bottom with a plurality of spaced, generally vertical, pressurized air supply pipes extending therethrough;
   a fluidized bed of comparatively inert material maintained in said container by said pressurized air from said supply nozzles;
   fuel supply means for supplying a solid carbonaceous fuel in solid granular form to the lower portion of the fluidized bed for combustion;
   additional pressurized air supply means extending into said container adjacent the periphery thereof for introducing a horizontal stream of air in said container coacting with the air from said vertical nozzles for causing the fluidized bed to circulate in a continuous horizontal circular path in said container; and vertically arranged laterally spaced heat exchanger coils in the region of the fluidized bed, wherein the laterally spaced regions of the fluidized bed lying between the coils contain means for introducing off-center air causing horizontal circular path circulation of the fluidized bed within each of the regions of the fluidized bed between the coils.

2. A fluidized-bed firing unit according to claim 1 characterized in that the fuel is introduced in the region of approximately 20% of the height of the bed.

* * * * *